US006285888B1

(12) United States Patent
Ostman

(10) Patent No.: US 6,285,888 B1
(45) **Date of Patent: *Sep. 4, 2001**

(54) MOBILE TELEPHONE ARRANGED TO RECEIVE AND TRANSMIT DIGITAL DATA SAMPLES OF ENCODED SPEECH

(75) Inventor: Kjell Ostman, Salo (FI)

(73) Assignee: Nokia Mobile Phones, Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 74 days.

(21) Appl. No.: 08/936,281

(22) Filed: Sep. 24, 1997

(30) Foreign Application Priority Data

Sep. 26, 1996 (GB) ............................................ 96 20 039

(51) Int. Cl.[7] ...................................................... H04Q 7/32

(52) U.S. Cl. ............................ 455/550; 455/557; 710/5; 709/107; 709/108

(58) Field of Search ................................... 455/550, 553, 455/557, 572, 127; 710/62, 14; 370/337, 328; 395/200.63, 200.31, 200.7; 379/93.08, 93.33, 100.17; 375/279; 712/43, 229, 34, 35, 226; 704/219, 222

(56) References Cited

U.S. PATENT DOCUMENTS

| | | | | |
|---|---|---|---|---|
| 5,287,512 | * | 2/1994 | Ellis | 395/425 |
| 5,327,576 | * | 7/1994 | Uddenfeldt et al. | 370/333 |
| 5,349,697 | | 9/1994 | Pelkonen | 455/89 |
| 5,513,246 | * | 4/1996 | Jonsson et al. | 379/60 |
| 5,532,576 | | 7/1996 | MacRobbie et al. | 323/274 |
| 5,557,639 | | 9/1996 | Heikkila et al. | 375/224 |
| 5,596,677 | | 1/1997 | Jarvinen et al. | 395/2.29 |
| 5,694,430 | * | 12/1997 | Critchlow et al. | 375/279 |
| 5,771,398 | * | 6/1998 | Park | 395/858 |
| 5,950,124 | * | 9/1999 | Trompower et al. | 455/522 |

FOREIGN PATENT DOCUMENTS

| | | | | |
|---|---|---|---|---|
| 0 342 631 A2 | | 11/1989 | (EP) . | |
| 0 472 511 A2 | | 2/1992 | (EP) . | |
| 0660558 A2 | | 6/1995 | (EP) . | |
| 0 677 974 A2 | | 10/1995 | (EP) . | |
| 0677974A2 | * | 12/1995 | (EP) | H04Q/7/32 |
| 2 268 372 | | 1/1994 | (GB) . | |
| 2 298 109 | | 8/1996 | (GB) . | |

* cited by examiner

*Primary Examiner*—William Cumming
*Assistant Examiner*—Alan Gantt
(74) *Attorney, Agent, or Firm*—Perman & Green, LLP

(57) ABSTRACT

A communication device, such as a mobile telephone, has a digital signal processor, fast randomly accessible storage and relatively slow storage devices. Instructions are transferred from the slow storage devices to the fast storage devices for execution by the digital signal processor. The device is configure to operate at a full data rate or at a reduced data rate (usually half-rate) within a time division multiplex. Transmission data is stored in the fast storage device during reduced data rate operation. The device is configured to change from reduced data rate operation to full data rate operation, while maintaining communication. While processing previously stored half-data rate data, program instructions for the full data rate mode of operation are written to the fast storage means, while said data is being processed and thereby being removed from said storage means.

20 Claims, 7 Drawing Sheets

MOBILE TELEPHONE ARRANGED TO RECEIVE AND TRANSMIT DIGITAL DATA SAMPLES OF ENCODED SPEECH

FIELD OF THE INVENTION

The present invention relates to processing communication data in accordance with first instructions or in accordance with second instructions.

BACKGROUND OF THE INVENTION

Recent advances in the production of digital signal processing devices, including single chip digital signal processors or application specific integrated circuits having DSP functionality, have allowed digital techniques to be exploited in mass-market communications environments. For example, first generation cellular mobile telephones are rapidly being superseded by second generation digital cellular mobile telephones, that provide at least three distinct advantages over the earlier analog systems. Firstly, they allow the overall size of the telephone to be reduced by reducing the requirement for large analog components. Secondly, they are less susceptible to signal degradation while at the same time transmitting signals that are virtually impossible to intercept by eavesdroppers. Thirdly, by the use of time division multiple access (TDMA), they allow greater use to be made of the available bandwidth, allowing a greater number of users to subscribe to mobile services while reducing operating costs for each individual circuit. Furthermore, TDMA technology substantially reduces the cost of base stations, given that a single radio transceiver may be used for establishing a plurality of calls.

Digital mobile telephones systems have been developed in the United States, in accordance with EIA IS-54 while throughout Europe the GSM standard has been adopted, allowing roaming techniques to be exploited across national boundaries. In accordance with the GSM system, a number of communications channels may be increased to a total of eight for each particular frequency pair. In addition, the system also employs frequency hopping such that, from one frame to the next, frames are transmitted on different frequencies.

It has been appreciated that, particularly in congested areas, customers will tolerate a degree of signal degradation while finding total service loss unacceptable to a greater extent. In order to exploit this situation, the GSM standard includes provisions for operating at half the normal transmission rate such that, rather than receiving a burst of data during each frame period, a burst in any one particular direction is only transmitted on alternate frame periods. Thus, using this so-called "half rate" mode of operation, the number of communication channels available for any particular transmission frequency is doubled. Similarly, further reductions in transmission rates may be envisaged, with data being transmitted on every fourth frame for example, although, at present, such a mode of transmission does not form part of the GSM recommendation.

Within the GSM recommendation, a plurality of techniques are employed in order to improve signal transmission while reducing the effects of noise and signal fading etc. The frequency hopping strategy has been identified above. In addition to this, an interleaving process is also performed, as described in the applicant's co-pending European patent application, published as 0 660 558.

Interleaving reduces the negative effects of burst errors but, as a result of the process, it is necessary for a plurality of transmitted frames to be received before data can be reassembled into its original order. Consequently, it is necessary for fast randomly accessible storage locations to be provided so that data may be buffered during the interleaving process and during the de-interleaving process. A mobile telephone will be required to buffer at least 1.5 blocks of source data (684 bits) in the full rate mode of operation, with 342 bits being required during half rate operation. Consequently, less buffering is required for the half rate mode of operation. However, during the coding and decoding process considerably more memory is required for the half rate mode of operation compared to that required for the full rate mode of operation.

It is known for DSPs to be provided with randomly accessible memory locations that are fast enough to supply instruction words to the DSP at the processor's normal operating rate. However, memory devices capable of operating at this rate are expensive and in any optimized design, the amount of this memory should be reduced in order to reduce overall costs. Often, a DSP will be required to perform a plurality of program types over a period of operation and under such circumstances it is often possible to replace a first set of memory instructions within DSP memory with a second set of DSP instructions within said memory. Such a procedure is commonly referred to as an "overlay" and as such may allow the amount of fast randomly accessible memory available to the DSP to be substantially reduced, for the same level of functionality.

However, a problem with known overlays is that a finite time is required for the new program instructions to be written to the fast executable memory. Although by its very nature, the fast randomly accessible memory may receive new instructions very quickly, the speed at which the transfer may take place will be determined by the speed at which the instructions may be read from bulk storage, possibly in the form of bulk storage associated directly with the DSP or, alternatively, from a larger area of slow storage associated with a slower microcontroller. In some situations, users may tolerate small interruptions in communication while a handover takes place from one type of operating system to another type of operating system. For example, in the United States, it is known for hand-overs of this type to take place when moving from congested city areas to more rural areas, given that digital systems tend to be used in the city areas while analog systems tend to be maintained within the rural areas. However, in accordance with the GSM recommendation, the maximum hand-over interval is only twenty milliseconds which, in most realizable mobile telephones would not provide sufficient time for the whole of the DSP's fast randomly accessible memory to be rewritten with a new program instruction set.

SUMMARY OF THE INVENTION

According to a first aspect of the present invention, there is provided a method of processing communication data in accordance with first instructions or in accordance with second instructions; characterised by reading said second instructions from a fast storage means; writing transmission data to said fast storage means for processing in accordance with said second instructions; and writing said first instructions to said fast storage means while said stored transmission data continues to be processed in accordance with said second instructions.

In a preferred embodiment, transmission data is written to said fast storage means for processing in accordance with said first instructions while previously written data continues to be processed in accordance with said second instructions.

The first and second type of instructions may relate to different coding and decoding processors formed substantially upon data transmitted at similar rates. For example, within the GSM recommendations, it is possible for data to be processed using a full rate codec or an enhanced full rate codec; where the latter enhances speech quality. However, in a preferred embodiment, the first instructions are configured to operate at full transmission data rate and the second instructions are configured to operate at a reduced data rate. This reduced data rate may consist of a rate which is half that of the full data rate.

According to the second aspect of the present invention, there is provided communication data processing apparatus, comprising processing means, fast storage means for supplying instructions to said processing means, slow storage means and transferring means for transferring instructions from said slow storage means to said fast storage means, characterised by first instructions for operating said device in accordance with a first mode of operation and second instructions for operating said device in accordance with the second mode of operation; transmission means for writing transmission data to said fast storage means under control of said second instructions; and control means for writing said first instructions to said fast storage means while continuing to process said transmission data in accordance with said second mode.

In a preferred embodiment, fast permanent storage means are provided, wherein said device is configured to read program instructions from said permanent storage means during reduced rate operation. Preferably, the program instructions for full rate operation are supplied to the fast memory device from a micro controller.

Thus, the present invention exploits a situation in which randomly accessible memory is being used to perform an interleaving process in that, as a hand-over is about to take effect, memory locations within the fast memory device will become available on a frame-by-frame basis. Consequently, it is possible for the released areas of memory to be identified and for new program instructions to be written to these memory locations until the whole of the program set has been built up and operation may switch over to its full rate mode, in response to the DSP receiving these new instructions for operational purposes.

BRIEF DESCRIPTION OF THE DRAWINGS

FIG. 6A illustrates use of the randomly accessible storage area identified in FIG. 5 during a half-rate mode of operation, while

DETAILED DESCRIPTION OF THE PREFERRED EMBODIMENT

The invention will now be described by way of example, with reference to the accompanying drawings identified above.

Figure 1:
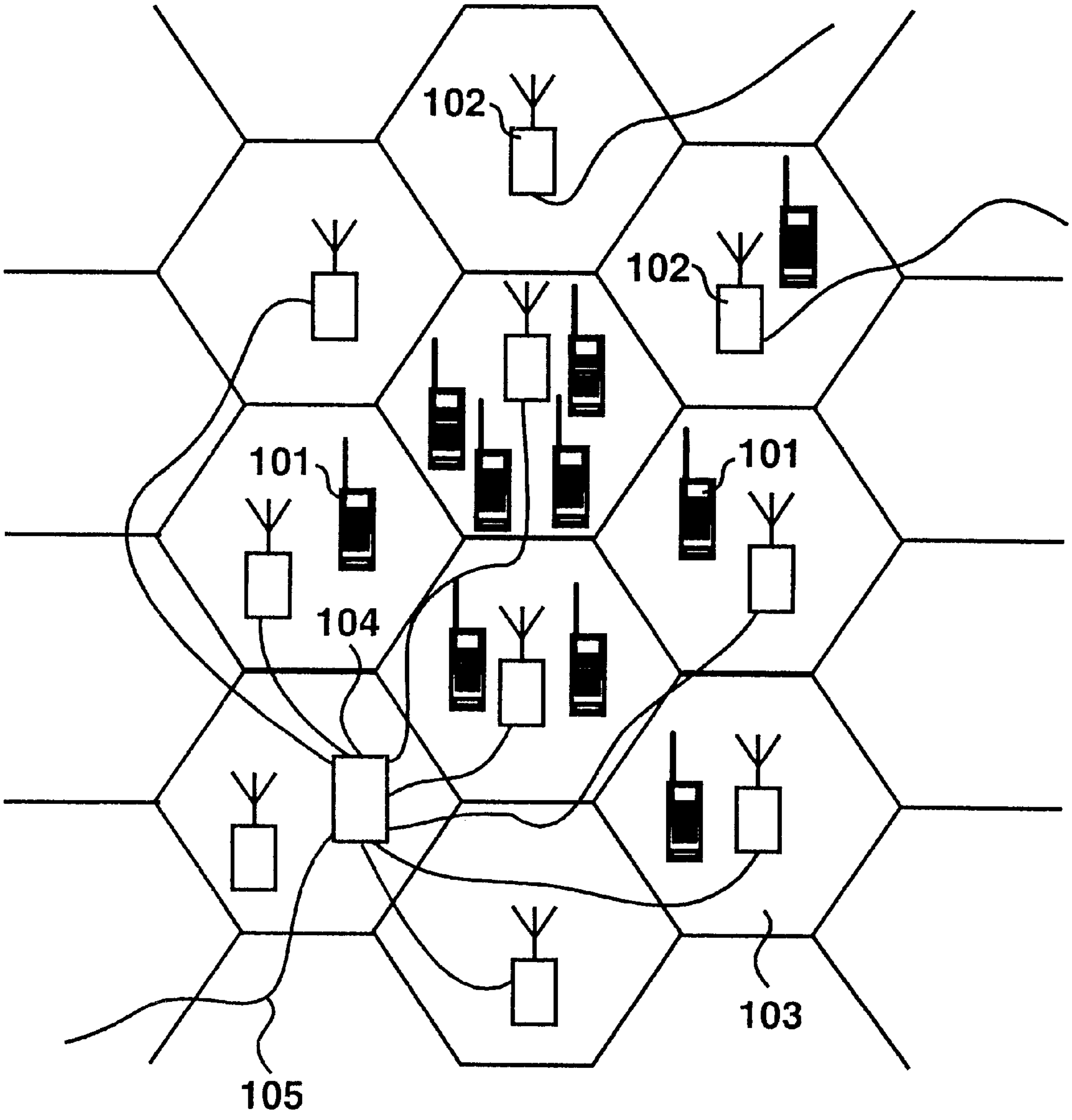
FIG. 1 illustrates a digital cellular telephone system having a plurality of cells and a base station in each of said cells, wherein said base stations are arranged to communicate with mobile telephones when said telephones are within the region covered by the cells.

A cellular mobile radio system is shown in FIG. 1 in which mobile telephones 101 communicate with base stations 102. Communication between the mobile telephones 101 and the base station 102 is performed in accordance with the GSM standard for digital time-division multiple access (TDMA) transmission. Generally, protocols are established such that a mobile telephone 101 will communicate with the base station 102 which provides the best signal transmission path, usually identified by measuring relative signal strengths. These assessments of signal strengths result in a geographical area being divided notionally into a plurality of cells 103 which, due to variations in terrain, atmospheric conditions and the presence of man-made objects etc will tend not to result in such a regular division as illustrated in FIG. 1.

The base stations communicate with a switching centre 104 which are in turn arranged to interconnect the base stations and provide access, via trunks 105, to other switched networks, such as the public switched telephone network and the integrated services digital network etc.

The mobile telephones are arranged to operate at a normal rate of data transfer in which a transmission frame is divided into a total of eight multiplexed channels with one of these channels being used for transmission and another frequency displaced channel being used for reception during each frame period. In addition, the base stations and some of the mobile telephones are configured to operate at half-rate, that is at a rate of transmission that results in the total data transfer being reduced by half compared to the normal rate mode of operation. In accordance with the half-rate mode of operation, data is transmitted on alternate frame periods. Consequently, the data bandwidth is effectively reduced by half, resulting in a degree of speech quality degradation when compared to using optimum techniques for transmission at full rate. However, for a given allocation of frequencies, it is possible to increase the number of mobiles that may be serviced within the operational region by a factor of two, thereby increasing the maximum level of possible penetration and reducing the risk of customers being unable to establish connections.

Mobile telephones capable of operating at half-rate will also include procedures for performing full rate transmission and the GSM standard is arranged such that switching may occur between normal rate and half-rate modes while a call is in progress with minimal disruption to the customer. If the number of customers requiring service is relatively small, all customers might be provided with channels operating a full bandwidth, that is to say, operating at the normal data rate. However, as the number of customers requiring service increases some customers will be switched over to operation at half-rate and eventually, as the system saturates, all customers will be operating at half-rate. However, in most working environments, some geographical regions will tend to become more congested than others, therefore it is more likely that some customers will be working at half-rate while other customers are working at full rate.

Decisions as to how hand-overs are controlled may be made in accordance with two basic philosophies. Firstly, cells in congested areas may be identified as half-rate only cells with hand-overs taking place as a mobile crosses cell boundaries. Alternatively, hand-overs from half-rate to full rate may be controlled in accordance with variations in signal strength, as disclosed in U.S. Pat. No. 5,532,576. Thus, it is appreciated that the level of signal degradation due to half-rate transmission will worsen with further degradation's due to signal strength, therefore mobiles at the periphery of cells will be given full rate channels while mobiles located close to a base station transmitter will be allocated half rate channels, therefore mitigating the effects of signal degradation due to half-rate transmission and minimizing the number of lost connections.

Other types of mode transfer may also occur for example if telephones are arranged to operate using an enhanced full rate codec in addition to a normal full rate codec. In this situation, the amount of channel usage remains unchanged but, where enhanced operation is available, the quality of speech as perceived by users is improved.

Figure 2:
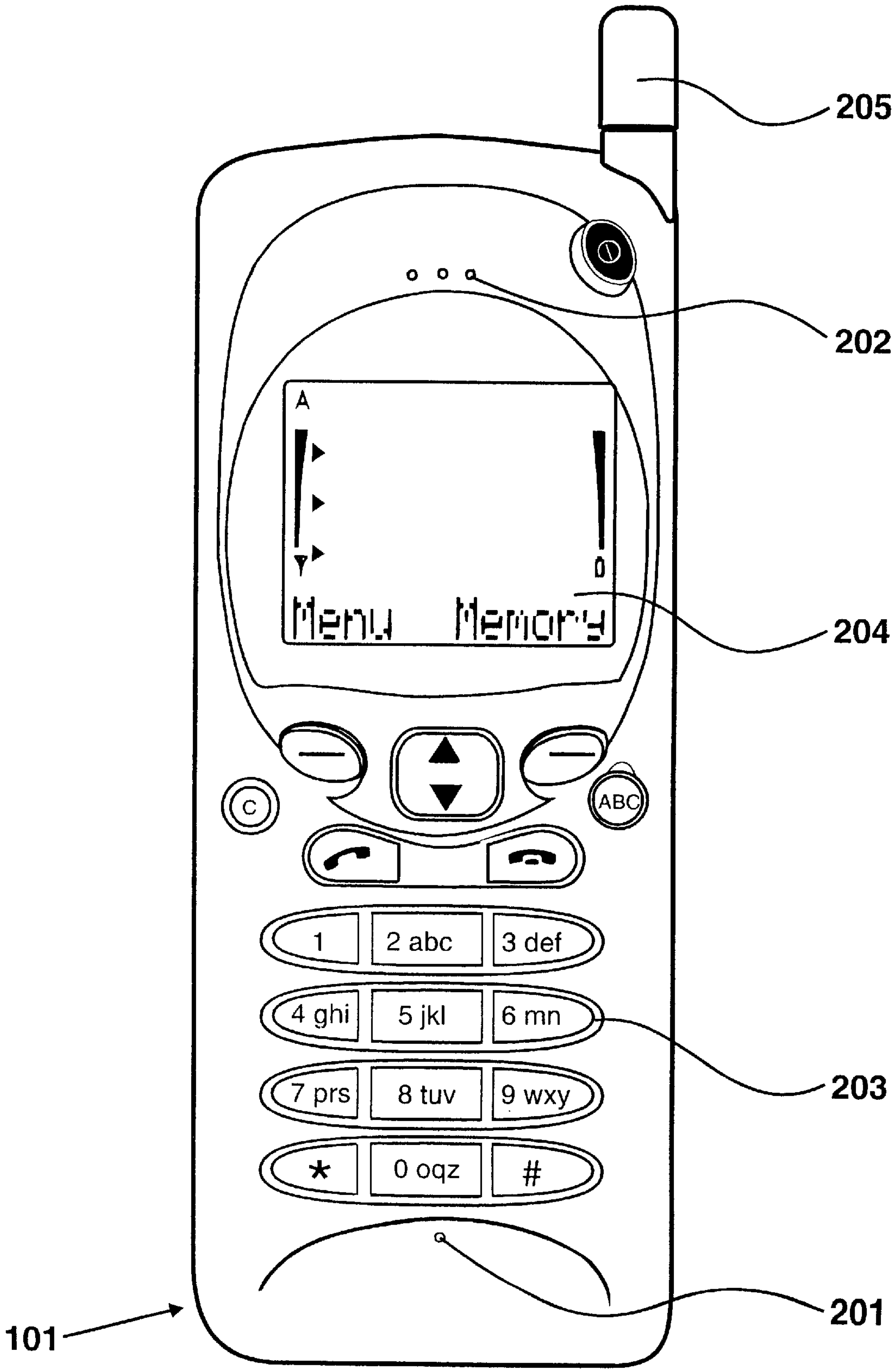
FIG. 2 illustrates a mobile telephone of the type identified in FIG. 1, having a plurality of co-operating sub-systems.

A mobile telephone 101 is shown in FIG. 2, having a mouth-piece microphone 201, an ear-piece loudspeaker 202, signalling buttons 203 and a liquid crystal display 204. The telephone 101 is arranged to communicate with the base stations 102 via a retractable antenna 205 and the digital processing of encoded speech signals is effected by means of a digital signal processor controlled in response to control signals generated by a microcontroller.

Figure 3:
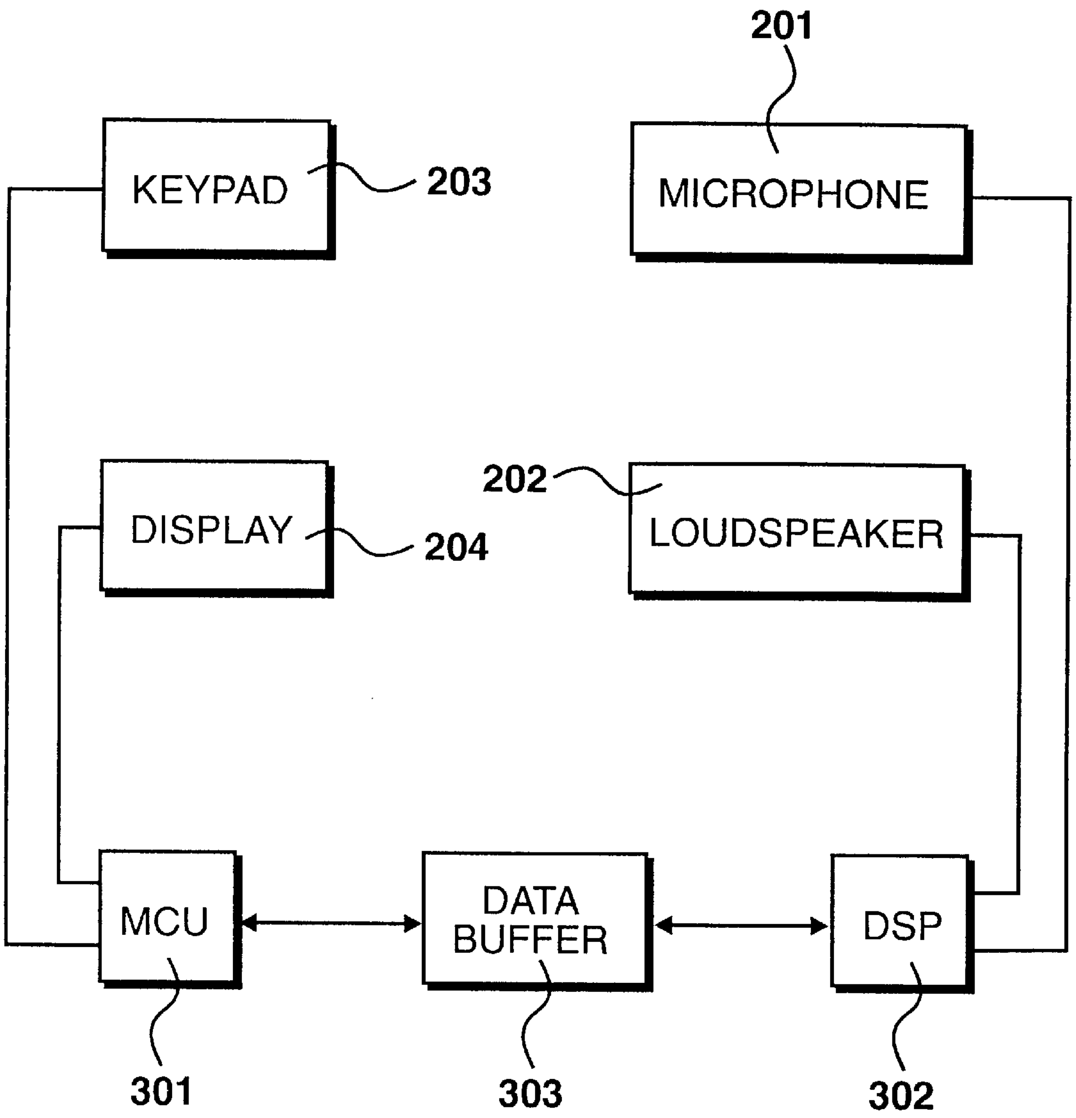
FIG. 3 illustrates the co-operating sub-systems of the mobile telephones shown in FIG. 2, arranged to operate in accordance with the GSM recommendation.

Internal circuitry for the mobile telephone shown in FIG. 2 is identified in FIG. 3, with similar reference numerals being given to similar components, such as the microphone 201, the loudspeaker 202, the keypad 203 and the display 204. The keypad 203 and the liquid crystal display 204 operate under the control of a microcontroller sub-system 301. The microcontroller sub-system 301 is responsible for the overall operation of the telephone and is particularly important when overseeing signalling operations and controlling operating characteristics, such as frequency modifications and signal strength comparisons. However, the microcontroller sub-system 301 is not capable of processing real-time digital speech or data signals and processing of this type is performed by a digital signal processor sub-system 302. The digital signal processor sub-system receives audio signals from microphone 201 and supplies audio signals to the loudspeaker 202.

The microcontroller sub-system 301 and the digital signal processor sub-system 302 perform their own identifiable tasks, however it is necessary at regular intervals for the microcontroller sub-system 301 to communicate with the digital signal processor sub-system 302 via a buffering circuit 303. Furthermore, it is possible for program instructions executable by the digital signal processor sub-system 302 to be stored in memory associated with the microcontroller sub-system 301 and for these data programs to be supplied to the digital signal processor sub-system 302 via the data buffer 303 during system initialization, in response to the telephone being switched on.

Figure 4:
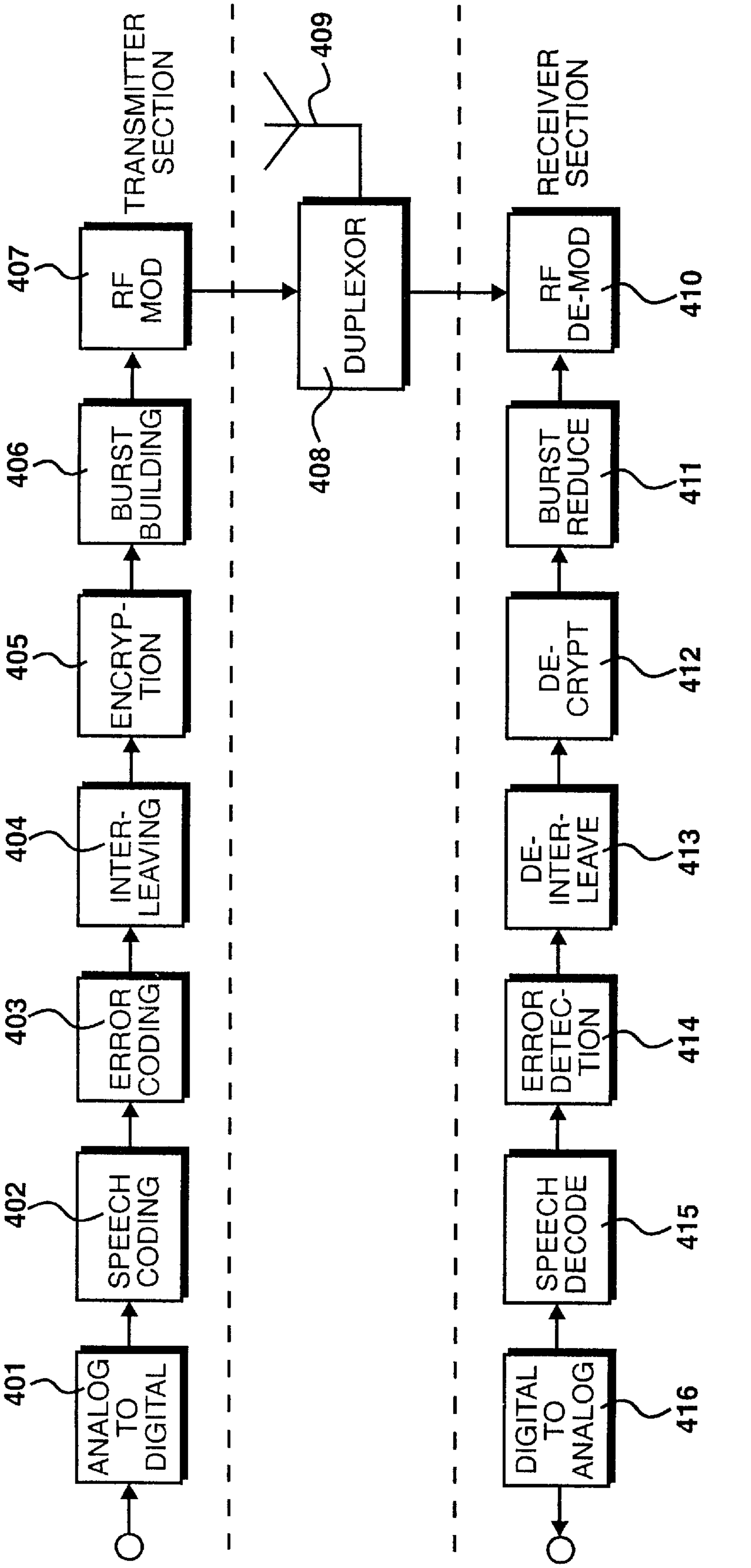
FIG. 4 illustrates operational constituents of the GSM operating standard executed upon the platform illustrated in FIG. 3.

Operations performed by the digital signal processor sub-system 302, in accordance with the GSM recommendation, are illustrated in FIG. 4. Input analog speech from microphone 201 is supplied to an analog to digital converter 401. The digitized speech is supplied to a speech coding process 402 arranged to code the speech in accordance with full rate techniques or in accordance with half rate techniques. In GSM systems, Vector some excited linear prediction (VSELP) coding and decoding is performed where, alternatively, when operating at full rate, regular pulse excitation-long time prediction coding is executed. In an alternative embodiment, enhanced full rate coding may be performed using algebraic code excited linear prediction type coding, the full details of which are specified in the GSM Recommendations. The processes employed are significantly different and separate sets of instructions are required in order to effect each. Similarly, the degree of storage required for each of these processes, in terms of storage for the instructions themselves and storage for buffering of incoming and outcoming data will also vary.

Speech coding is performed by the speech coding process 402 and the coded speech is supplied to an error coding process 403, arranged to introduce additional redundant data into the data stream that may be used subsequently to detect and correct errors due primarily to radio interference. The output from the error coding process 403 is supplied to an interleaving process 404 arranged to interleave data across time such that burst errors, typical of those encountered in radio communications, are translated into dispersed single bit errors after de-interleaving is performed at the receiver. When dispersed in this way, it is possible for the error detecting and correcting procedures to correct individual bit errors in a detection and correction process forming part of the receiver.

The output from the interleaving process is supplied to an encryption process 405 arranged to perform a bit-by-bit exclusive-OR operation with a pseudo-random cipher bit stream, such that it is virtually impossible for an unauthorized listener to tune into and decrypt phone calls without being given access to the cipher.

The output from the encryption process 405 is supplied through a burst building process 406, arranged to translate the stream of bits supplied to its input into bursts of a high bit rate and short duration. The purpose of the burst building process 406 is to reduce the time during which the cellular telephone is actually transmitting data, such that periods during which transmission does not occur provide time for reception by the receiving circuit and for communication to be effected by other cellular telephones, as part of the dynamic time division multiple access configuration.

The output from the burst building process 406 is supplied to a radio frequency modulator 407, which modulates a radio frequency carrier wave at a frequency suitable for cellular telephone traffic. The output from the RF modulation process 407 is supplied to the input of a duplexor 408, arranged to share an antenna 409 between transmission and reception circuitry.

The reception of data by the cellular telephone is performed substantially in accordance with the reverse process to that described above and therefore comprises a radio frequency demodulating process 410, a burst reduction process 411, a decryption process 412, a de-interleaving process 413, an error detection and correction process 414, a speech decoding process 415 and a digital to analog conversion process 416.

Figure 5:
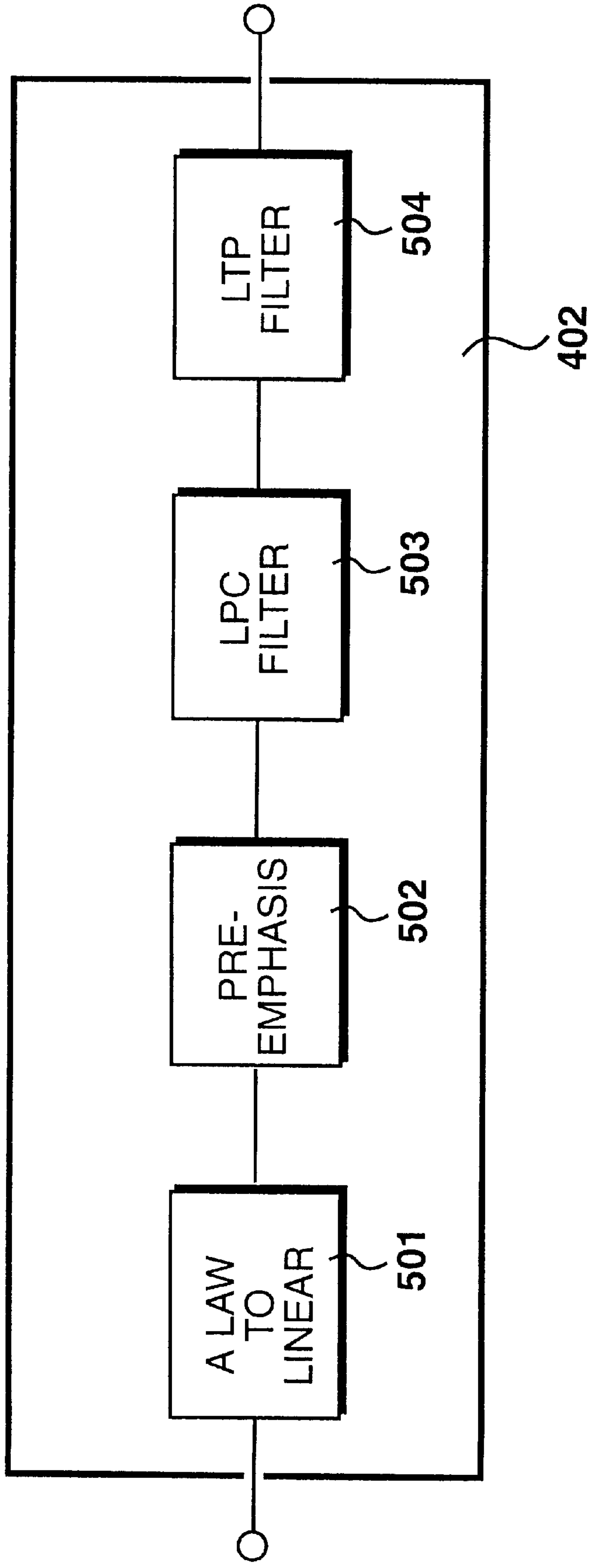
FIG. 5 details the arrangement of storage locations within the digital signal processor sub-system identified in FIG. 3, having a randomly accessible storage are.

Speech coding process 402 is illustrated in FIG. 5. Firstly, A law digital speech is converted to linear representations thereof, by an A law to linear process 501. Thereafter, digital samples are modified to introduce pre-emphasis to the underlying signal at step 502, with LPC filtering being performed at process 503 and LTP filtering being performed at process 504, as described in the GSM Recommendations.

Figure 6A:
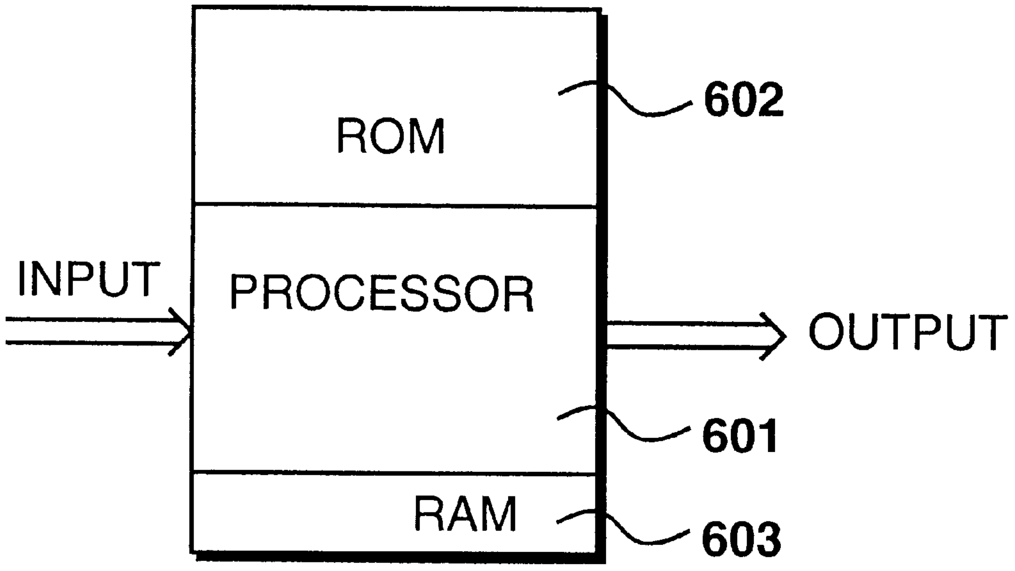

The DSP sub-system 302 includes a DSP chip as illustrated in FIG. 6A. Many suitable chips are available for this purpose, such as an AT&T 1616, consisting of the processor itself 601, an area of read-only memory 602 and an area of random access memory 603. The cost of the chip will depend upon the degree of memory specified and in this example 40 kilowords of read-only memory 602 are provided in combination with 8 kilowords of random access memory 603; each word comprising a total of sixteen bits. Thus, the specification of on-chip memory becomes an important aspect of the overall design, given that the level of memory should not be over specified, thereby unnecessarily increasing the price of the system, while at the same time sufficient memory provision must be made to ensure that DSP programs may operate satisfactorily.

The DSP operates at a cycle rate of 25 nanoseconds; therefore memory access time must be less than this and typically allows accesses over durations of ten to fifteen nanoseconds. Memory capable of operating at this speed is expensive when compared to conventional microcontroller memory devices which provide an access time in the region of 150 nanoseconds.

Program instructions for the DSP processor are held in the processor's ROM 602, thereby minimizing the requirement for programs to be downloaded from the micro-controller sub-system 301. The associated fast random access memory 603 is primarily provided for data handling and as previously identified, memory of this type is required in order to buffer bursts of transmitted data so as to interleave data for transmission and de-interleave received data. The degree of RAM specified for a particular implementation will therefore be determined by whichever process has the highest RAM requirement. Thus, operating in the half-rate mode places a higher RAM requirement on the system than similar operations performed at full rate.

Figure 6B:
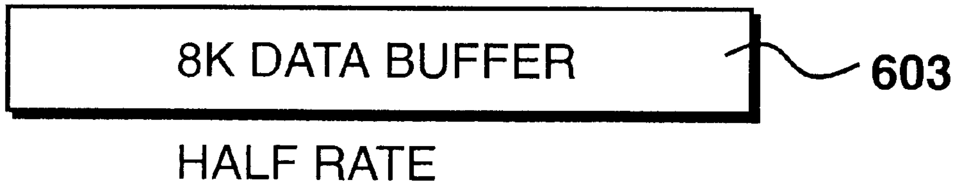
FIG. 6B shows allocation of usage of the randomly accessible storage area during the full rate mode of operation.
Figure 6C:
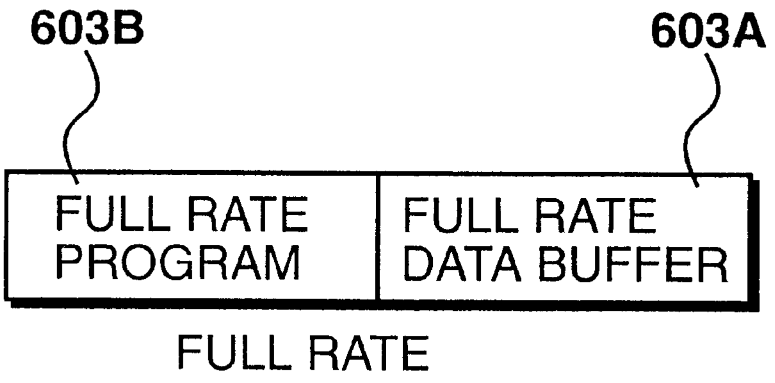
FIG. 6C shows allocation of usage of the randomly accessible storage are during the full rate mode of operation.

The distinction between data requirements during full rate transmission and half-rate transmission is illustrated in FIGS. 6B and 6C. FIG. 6B shows the processors RAM 503 during half-rate transmission, for which the whole of the 8 kilowords of data area must be made available for the buffering of data during transmission and reception. The whole of the program executable by the processor 601 for half-rate transmission is retained within the read-only memory 602 therefore the processor may quickly switch from full rate operation to half-rate operation given that the instructions required to effect this mode of operation are directly addressable from memory 602.

The requirement for data memory within the RAM 603 changes when the telephone switches over to full rate operation. During full rate operation only half of the memory locations in the random access memory 603 are required in order to buffer data, identified in FIG. 6C as region 603A. Consequently, during full rate operation the remaining area, identified as 603B, may be used for other purposes. Thus, area 603B is used to store instructions relating to full rate operation. Consequently, it is not necessary for these instructions to be stored within the read-only memory area 602, thereby reducing the overall requirement for memory of this type. The program instructions for operation at full rate are stored in a relatively slow storage area associated with the micro-controller unit 301. Thus, in order to initiate operation at full rate, these program instructions are downloaded from said slow memory area, forming part of the micro-controller sub-system 301, via the data buffer 303, to the DSP sub-system 302. Upon reaching steady state, full rate transmission is effected by the DSP processor 601 reading instructions from section 603B of its associated random access memory 603 with the remaining section 603A being used to buffer incoming and outgoing data.

Figure 7:
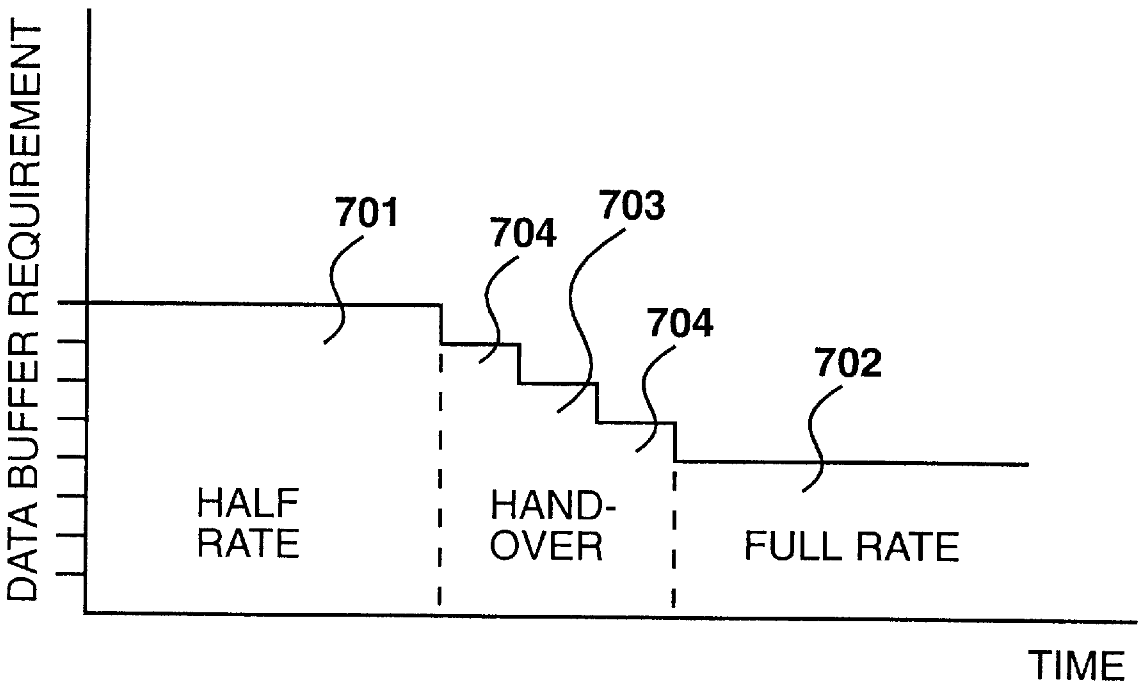
FIG. 7 illustrates the allocation of randomly accessible storage areas during a hand-over period from the half-rate mode of operation to the full rate mode of operation.

A hand-over from half-rate operation to full rate operation is illustrated in FIG. 7. A hand over will consist of a first period 701 during which transmission occurs under the half-rate protocols with programming instructions being read from the associated ROM 602. Similarly, a full-rate period of operation 702 is identified, during which program instructions are read from the associated random access memory section 603B with buffering being provided exclusively within region 603A. Between these two modes of operation a hand over period 703 is provided during which old data will be processed in accordance with the half-rate protocols while new data is being processed in accordance with the full rate protocols. Thus, it is not necessary for one mode of operation to completely stop before the next operation is initiated and the loading of new program data into the random access memory area 603 is not, therefore, effected in accordance with known overlay procedures.

Random access memory area 603 provides a buffer for data as it is being processed for transmission and processed as part of the reception procedures. This buffering is required on a block-by-block basis, therefore as a hand over occurs from the first mode of operation (that is half-rate) to a second mode of operation (that is full rate) the requirement for buffer space within the random access memory would be reduced in stages, illustrated by steps 704 in FIG. 7. Consequently, as data regions become available and are not required for the further buffering of data under the half-rate procedures, these data regions are loaded with program instructions for effecting the full rate mode of operation.

Thus, at the hand-over point when the processor 601 is required to process data in accordance with the full rate mode of operation, sufficient data instructions will have been loaded to the random access memory 603 thereby allowing communication to be effected under the full rate mode. Program instructions for the full rate mode of operation are written to the fast random access memory 603 while data relating to the reduced rate of transmission still continues to be processed. Thus, given the way in which the data is buffered for processing in accordance with the half-rate mode of operation, data regions within the data storage area 601 will become available in identifiable blocks. Consequently, it is possible for the instructions relating to full rate operation to be loaded, slowly from the slow storage devices 301 and 303, into the fast data storage regions within RAM 603, as and when they become available. It is therefore possibly to effect the hand-over from half-rate operation to full rate operation relatively smoothly without requiring all of the program instructions to be stored within the read-only memory area 602. Consequently, it is possibly to effect the hand over from half-rate operation to full rate operation within the allowed 20 milliseconds because the program instructions relating to the full rate mode of operation will have been written to the fast memory area 603 while processing half-rate data. In this way, it is possible to reduce the overall requirement for fast memory associated with the DSP while at the same time ensuring a smooth hand over from half-rate operation to full rate operation within specified tolerances.

Program instructions for operating at half-rate will remain resident within the ROM 602, although not actually required during full rate operation. Consequently, the hand-over from the full-rate mode of operation to the half-rate mode of operation may always be effected very smoothly, given that there is no requirement to load program instructions into random access memory for subsequent execution.

What is claimed is:

1. A method of processing communication data represented as digital samples in which said samples are processed in a first mode under the control of a firsts instruction set having first instructions or in a second mode under the control of a second instruction set having second instructions, wherein each of said modes requires samples to be buffered and said first mode requires more buffering than said second mode; comprising:

reading said first instructions from a read only memory, said first set of instructions controlling the writing of data samples to a random access memory and the reading of stored data samples from said random access memory;

changing operation from said first mode to said second mode;

processing samples in accordance with said first mode, resulting in data being read from said random access memory to provide vacated memory locations; and writing said second instruction set to said vacated memory locations in said random access memory while previously written samples continue to be processed by said first instruction set.

2. A method according to claim 1, wherein transmission data is written to said random access memory for processing in accordance with said second instructions while previously written data continues to be processed in accordance with said first instructions.

3. A method according to claim 1, wherein said first instructions are configured to operate at a reduced transmission data rate and said second instructions are configured to operate at full data rate.

4. A method according to claim 1, wherein said second instructions are written to said random access memory after being read from a slow storage means.

5. A method according to claim 4, wherein said second instructions are written to said fast storage means via a micro-controller.

6. A method according to claim 1, wherein said modes of operation include encryption procedures.

7. A method according to claim 1, wherein modes of operation include interleaving procedures.

8. A method according to claim 1, wherein said method is executed within a mobile telephone.

9. A communication data processing apparatus comprising processing means, read only memory and random access memory wherein;

said processing means is configured to process communication data represented as digital samples in a first mode under the control of a first instruction set having first instructions or in a second mode under the control of a second instruction set having second instructions;

each of said modes requires samples to be buffered and said first mode requires more buffering than said second mode;

said first instructions are read from said read only memory and control the writing of data samples to said random access memory and the reading of stored data samples from said random access memory;

operation is changed from said first mode to said second mode;

samples are processed in accordance with said first mode resulting in data being read from said random access memory to provide vacated memory locations; and said second instruction set is written to said vacated memory locations in said random access memory while previously written samples continue to be processed by said first instruction set.

10. Apparatus according to claim 9, wherein transmission data is written to said random access memory for processing in accordance with said second instructions while previously written data continues to be processed in accordance with said first instructions.

11. Apparatus according to claim 9, wherein first instructions are configured to operate at a reduced transmission rate and said second instructions are configured to operate at full data rate.

12. Apparatus according to claim 9, wherein said second instructions are written to said random access memory after being read from a slow storage means.

13. Apparatus according to claim 12, wherein said second instructions are written to said random access memory means via a microcontroller.

14. Apparatus according to claim 9, wherein said modes of operation include encryption procedures.

15. Apparatus according to claim 9, wherein said modes of operation include interleaving procedures.

16. A mobile telephone arranged to receive and transmit digital data samples of encoded speech, comprising a processing means, read only memory and random access memory, wherein;

said processing means is configured to process said sample of encoded speech in a half rate mode under the control of a first instruction set or in a full rate mode under the control of a second instruction set, wherein;

each of said modes require samples to be buffered and said half rate mode requires more buffering than said full rate mode;

said first instructions are read from read only memory and control the writing of data samples to said random access memory and a reading of stored data samples from said random access memory;

operation is changed from said half rate mode to said full rate mode;

samples are processed in accordance with said half rate mode resulting in data being read from said random access memory to provide vacated memory locations; and said second instruction set is written to said vacated memory locations into random access memory as previously written samples continue to be processed by said first instruction set.

17. A mobile telephone according to claim 16, wherein speech data is written to said random access memory for processing in accordance with said full rate instructions while previously written data continues to be processed in accordance with said half rate instructions.

18. A mobile telephone according to claim 16, wherein said second instructions are written to said random access memory via a micro-controller.

19. A mobile telephone according to claim 16, including means for performing encryption procedures.

20. A mobile telephone according to claim 16, including means for performing interleaving procedures.

* * * * *